United States Patent [19]

Olansen et al.

[11] 4,335,748
[45] Jun. 22, 1982

[54] BIDIRECTIONAL CONTROL VALVE

[75] Inventors: Ronald A. Olansen, Lyme, Conn.; Linda Pavelski, Ashaway, R.I.

[73] Assignee: Posi-Seal International, Inc., North Stonington, Conn.

[21] Appl. No.: 139,751

[22] Filed: Apr. 14, 1980

[51] Int. Cl.³ .......................... F16K 1/22; F16K 5/00
[52] U.S. Cl. .............................. 137/614.11; 251/306; 251/316
[58] Field of Search ...................... 251/306, 316, 317; 137/614.11, 614.18

[56] References Cited

U.S. PATENT DOCUMENTS

| | | | |
|---|---|---|---|
| 3,666,236 | 5/1972 | Gachot | 251/306 |
| 3,721,425 | 3/1973 | Jones et al. | 251/317 |
| 3,815,869 | 6/1974 | Smith | 251/306 |
| 3,937,441 | 2/1976 | Baumann | 251/298 |
| 4,088,299 | 5/1978 | Maciulaitis et al. | 251/306 |
| 4,113,268 | 9/1978 | Simmons et al. | 277/168 |
| 4,162,782 | 7/1979 | Wilkins | 251/306 |
| 4,165,859 | 8/1979 | Maciulaitis et al. | 251/173 |
| 4,176,820 | 12/1979 | Broadway | 251/317 |
| 4,258,901 | 3/1981 | Zinnai et al. | 251/173 |

Primary Examiner—A. Michael Chambers
Attorney, Agent, or Firm—Kenyon & Kenyon

[57] ABSTRACT

A bidirectional fluid flow control valve has two bifurcated elastic seat rings positioned in respective undercut grooves which are spaced apart in the flow passageway of the valve body, one on either side of the axis of rotation of a butterfly valve disc having two corresponding spaced apart annular sealing surfaces. One of the undercut seat grooves may be formed in a separate detachable seal ring to facilitate assembly of the disc in the valve. The valve disc is axially symmetrical with respect to its midplane, so that operating torque and flow characteristics of the valve are the same regardless of the direction of fluid flow through the valve.

12 Claims, 13 Drawing Figures

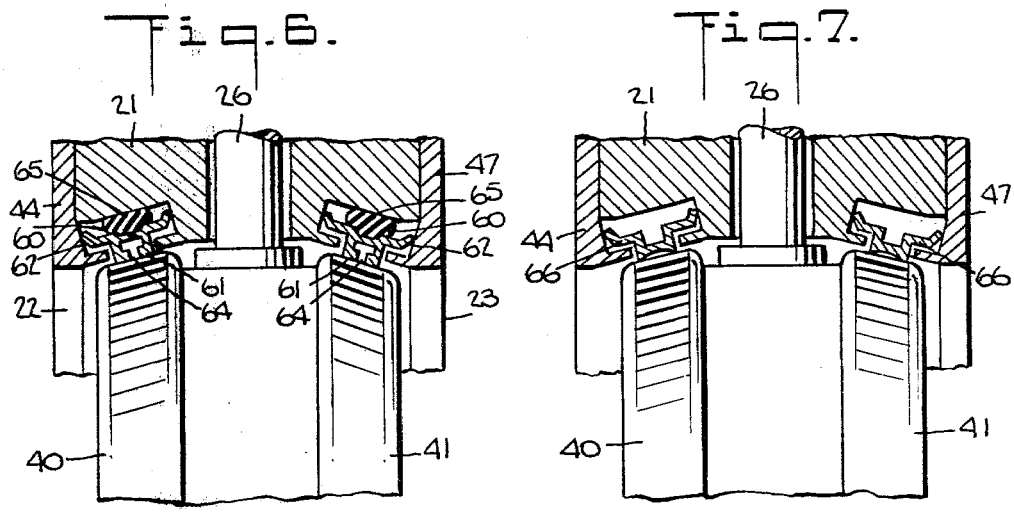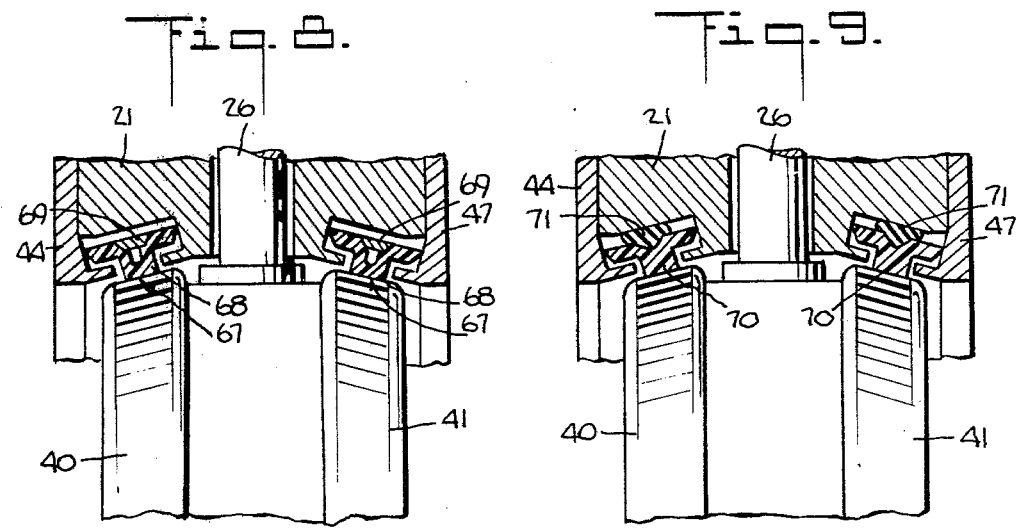

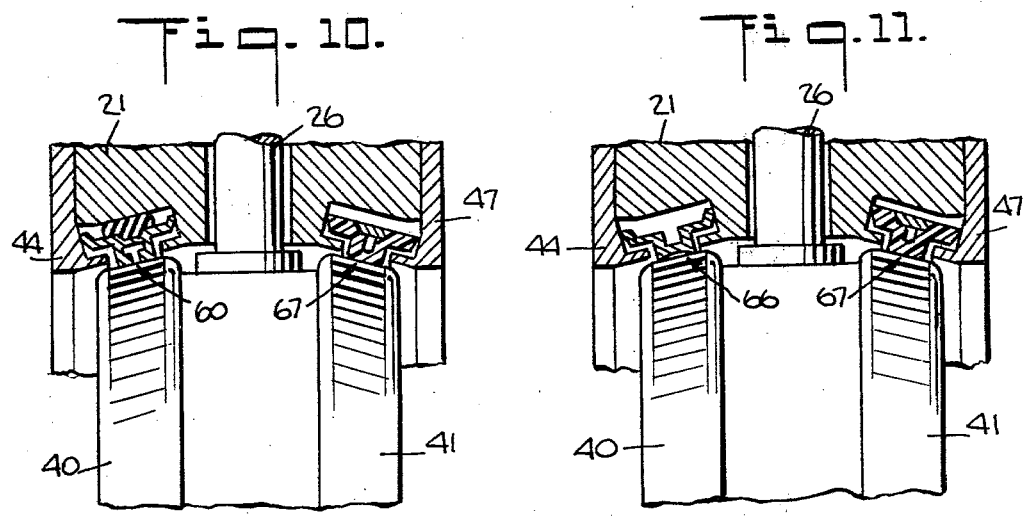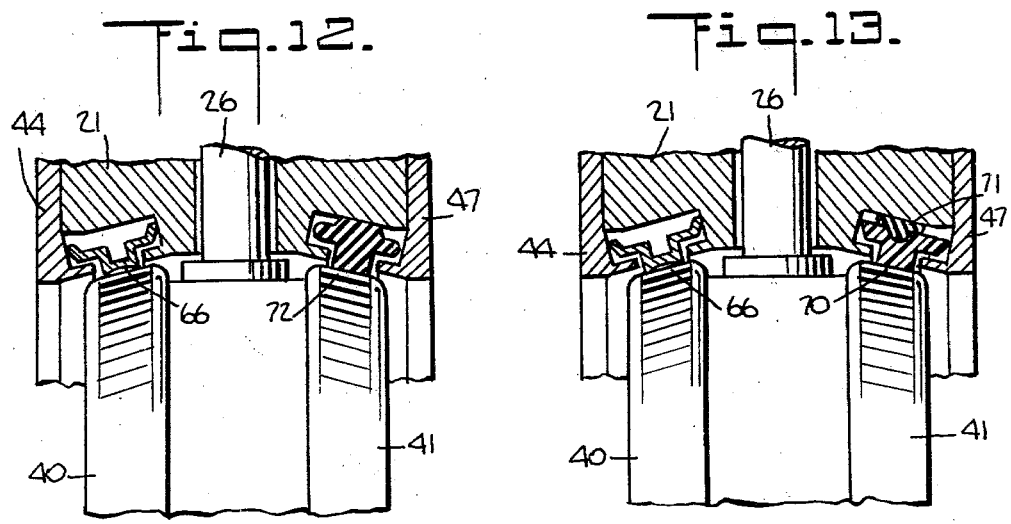

BIDIRECTIONAL CONTROL VALVE

This invention relates to disc-type fluid flow control valves, and particularly to a disc valve having an upstream seat and a downstream seat.

U.S. Pat. Nos. 3,642,248, 3,986,699, and 4,113,268, the disclosures of which are incorporated herein by reference, describe various seat designs for disc valves which incorporate a seat ring having a bifurcated cross section and mounted in an undercut seat groove. The seat designs of these patents provide effective sealing under extreme ranges of pressure and temperature.

The disc valves incorporating the seats of these patents are of the conventional type in which the valve disc has a single annular sealing surface offset from the axis of rotation of the disc. Since the sealing surface is tapered, the sealing characteristics of the valve are better when the valve is arranged so that its inlet is on the shaft side of the disc. In this arrangement, system pressure when the valve is shut tends to wedge the disc into better contact with the seat.

In many valve applications it is desirable to have a double seat with an intermediate bleed line. If both seats are on the same side of the disc, the two seat rings must be of different diameters to mate with the spherically tapered sealing surface of the valve disc. There are also special sealing applications where a combination of sealing capabilities are required, such as cryogenic and fire-safe. Such widely different operating conditions require different types of seat rings for optimum sealing. In addition, some valve applications require substantially identical sealing, torque, and flow characteristics, for fluid flowing in either direction. Conventional single seat disc valves typically exhibit torque reversal and have different torque curves depending on the direction of flow.

Disc valves are known which have separate upstream and downstream seats on opposite sides of the disc, for example as disclosed in U.S. Pat. Nos. 3,593,960; 3,815,869; 3,596,876; and 4,108,199. The seat designs of such valves, however, do not provide maximum sealing capability for conditions ranging from cryogenic to fire-safe.

Accordingly, it is an object of the present invention to provide an improved bidirectional disc-type valve having improved sealing capability under extremely wide ranges of temperature and pressure.

It is another object of the invention to provide a disc-type valve with low hydrodynamic torque, absence of flow reversal, and identical torque curves for flow in either direction.

It is a still further object of the invention to provide a disc valve having upstream and downstream seats which is economical to manufacture, easy to assemble and disassemble, and is readily adaptable to a wide varity of operating conditions.

These and other objects are achieved in the present invention which provides a bidirectional fluid flow control valve comprising a valve body having first and second spaced apart faces and an axial passageway for providing a fluid flow path between the faces; a valve disc mounted in the body, on an axis which lies in the midplane of the disc and perpendicularly intersects the flow axis of the passageway, for rotation between a valve shut position in which the valve disc is perpendicular to the flow axis and a fully open position in which the valve disc is substantially parallel to said flow axis, the valve disc having first and second spaced apart, annular sealing surfaces on opposite sides of said midplane; first and second annular seat rings of elastic material mounted in the valve body in respective first and second axially spaced apart counterbores positioned so that the seating rings contact the respective sealing surfaces of the valve disc when the disc is in the shut position; and first and second retainer rings fastened to the first and second valve faces, respectively, to keep the corresponding seating rings in said counterbores, wherein each retainer forms with the respective counterbore an undercut groove, and each seating ring is bifurcated in cross section to form a rib portion which extends through the groove opening to make interfering elastic contact with the respective sealing surface of the valve disc and two skirt positions which make interfering elastic contact with the sidewalls of the respective grooves.

Preferably, a third counterbore is formed in said one face of the valve body, the valve further comprising a seal ring slidingly fitting in said third counterbore, said first counterbore being formed in said seal ring; means for sealing between the valve body and the seal ring; and means for detachably fastening the seal ring to the valve body.

The material of the bifurcated seat rings may be either metal or a plastic material, the seat rings may be installed either alone or with elastomeric or metal backup rings, and the two seat rings may be of different materials and design, depending on the intended application for the valve.

These and other objects, features, and advantages of the improved bidirectional flow control valve of the present invention will become more clearly apparent from the following description of the preferred embodiments as illustrated in the attached drawings.

BRIEF DESCRIPTION OF THE DRAWINGS

FIGS. 6–13 are simplified schematic detail views, in cross section, of alternative seat ring arrangements for the valve of FIG. 1.

DETAILED DESCRIPTION OF THE PREFERRED EMBODIMENTS

Figure 1:
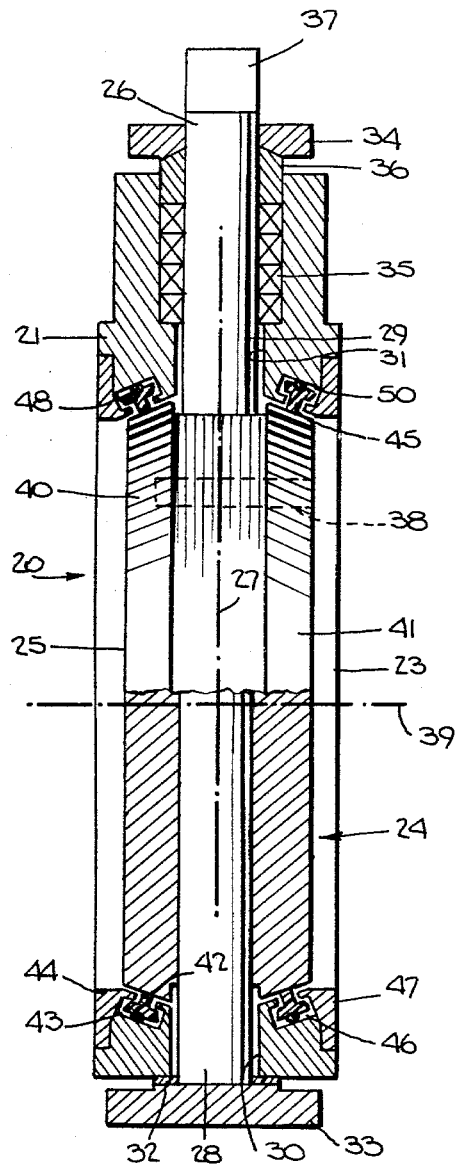
FIG. 1 is a simplified schematic view, in cross section, of a bidirectional flow control valve according to the invention.

In the following description, identical or substantially identical parts in the several figures will be designated by the same reference numeral.

With reference to FIG. 1, a disc valve 20 has an annular valve body 21 with flat, parallel first and second faces 22, 23 and an axial flow passageway 24 connecting the two faces. A valve disc 25 is mounted on a valve shaft 26 for rotation about a diametral axis 27 lying in the midplane of the disc.

Shaft 26 has a lower journal 28 and an upper journal 29 rotatably received in respective bushings 30 and 31 in the valve body. The lower shaft bushing is sealed by a gasket 32 and bonnet 33. The upper end of shaft 26 extends through a packing gland 34, containing packing 35 compressed by gland follower 36, and terminates in a squared stem 37 suitable for attachment of a control lever or other actuator (not shown).

Valve disc 25 is fixed to shaft 26 by a disc pin 38, so that a quarter turn of the shaft will rotate the disc from the illustrated valve shut position, in which the disc is perpendicular to the flow axis 39 of the flow passageway, to a fully open position, in which the disc is parallel to the flow axis. The valve disc has a first annular sealing surface 40 spaced axially from one side of its midplane and a second annular sealing surface 41 spaced an equal distance from the other side of its midplane. The first and second sealing surfaces comprise annular sections of a spherical surface having its center at the intersection of the shaft axis 27 with the flow axis 39.

In the valve shut position, the first sealing surface engages a first seat ring 42 retained in an undercut groove 43 by a first retainer ring 44, and the second sealing surface engages a second seat ring 45 retained in an undercut groove 46 by a second retainer ring 47. It will be readily apparent from FIG. 1 that the valve disc is symmetrical with respect to its midplane and so are the seat rings, seat ring grooves, and retainer rings. This design minimizes the number of different parts and simplifies machining operations.

Figure 2:
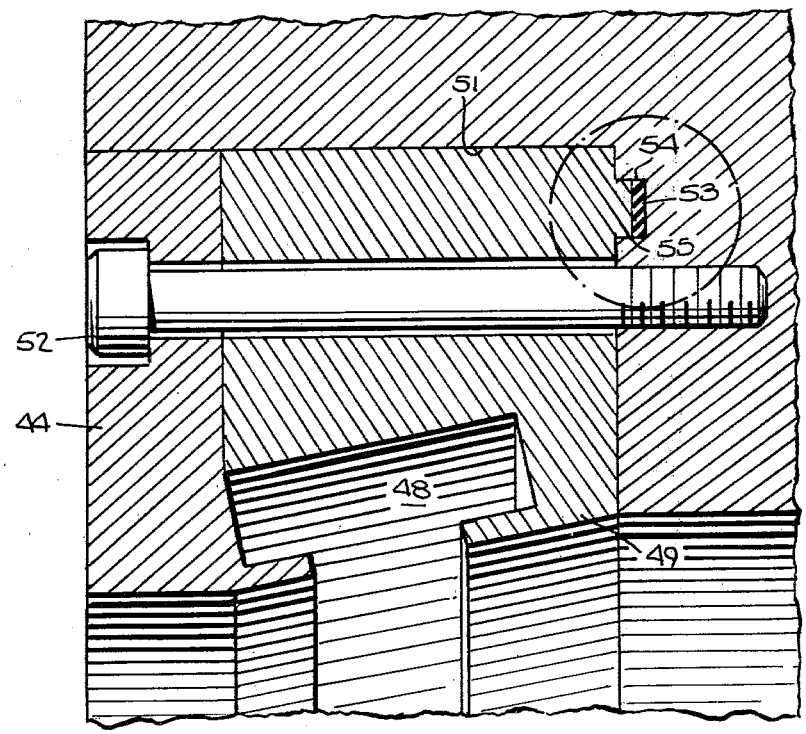
FIG. 2 is an enlarged detail, in cross section, of an alternative embodiment of one seat assembly.

Since the sealing surfaces of the valve disc are axially spaced from the midplane, to provide room for the valve shaft, the surfaces are tapered in cross section, and the maximum diameter of each sealing surface is on the inboard side of the corresponding seat ring groove (i.e., toward the midplane of the valve. To facilitate assembly of the disc in the valve body, one of the seat assemblies (for example, the first seat ring assembly) is made as shown in FIG. 2, with the bottom and one side of the undercut seat ring groove being formed by a tapered first counterbore 48 in a separate seal ring 49. The retainer ring 44 provides the other side of the undercut seat ring groove. A similarly tapered second counterbore 50 (see FIG. 1) can be cut directly in the valve body for the opposite seat ring groove because the disc can be installed and removed through the larger opening in the first face of the valve body. The retainer ring and seal ring are slidingly fitted in a third counterbore 51 in the valve body 21 and are detachably fastened to the valve body by means such as socket head screws 52.

Various types of sealing means may be provided to prevent leakage between the separate seal ring and the valve body, depending on the intended application for the valve. In FIG. 2 a graphite gasket 53 is compressed against the bottom of a circular groove 54 machined in a surface of counterbore 51 by a mating circular rib 55 on the seal ring.

Figure 3:
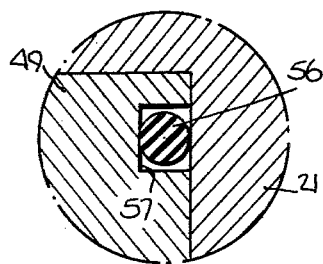
FIGS. 3–5 are detail views, in cross section, of alternative seal embodiments for the seat assembly of FIG. 2.
Figure 4:
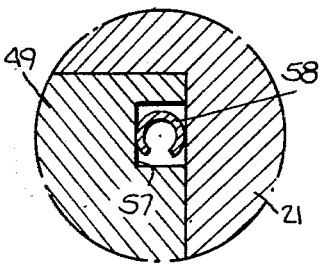
Figure 5:
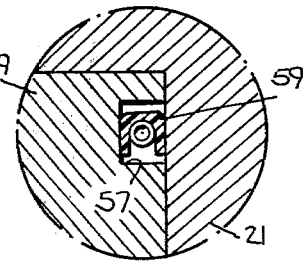

FIG. 3 shows an alternative sealing assembly in which a soft elastomeric O-ring 56 is compressed in a circular groove 57 in a surface of the seal ring 49. In FIG. 4 a metal O-ring 58 is substituted for the elastomeric O-ring of FIG. 3, and in FIG. 5 a cryogenic type seal ring 59 is shown. Seal ring 59 has a U-shaped cross section, with the open end of the U disposed towards the high pressure side of the joint, so that the sides of the U will be forced into greater sealing contact with the contiguous surfaces of the seal ring and valve body, respectively.

As mentioned previously, a particularly important advantage of the present invention is that the valve seat rings can be individually selected to meet a wide variety of valve operating conditions. FIGS. 6 through 13 illustrate a number of different seat ring configurations and combinations. Since the individual seat ring designs correspond to known commercially available configurations, they will be described only briefly here to indicate possible applications for the valve.

In FIG. 6, tandem fire-safe seat rings 60 are shown. Each of these seat rings is made of metal, with a rib portion 61 extending through the opening of the undercut groove into preloaded sealing contact with the corresponding disc seating surface and two skirt portions 62, 63 extending laterally into preloaded sealing contact with the contiguous sidewalls of the groove. A plastic insert ring 64 in the face of the rib portion provides maximum sealing effectiveness between the seat ring and the disc, and an elastomeric O-ring 65 positioned between the skirt portions provides additional sealing between the seat ring and the bottom of the groove. In the event of fire, the plastic insert of ring 64 and O-ring 65 may be completely destroyed, yet the preloaded metal seat ring 60 will still provide almost leak-free sealing.

In FIG. 7, the valve is equipped with only metal seat rings 66, in tandem. FIG. 8 shows two cryogenic seat rings 67 comprising a plastic bifurcated ring 68, made of polytetrafluoroethylene (PTFE) or similar material, and a metal compression ring 69 disposed between the skirt portions of the bifurcated plastic ring. In FIG. 9, each seat comprises a bifurcated plastic (e.g., PTFE) seat ring 69 and a soft rubber or other elastomeric O-ring 70.

FIGS. 10 through 13 illustrate possible combinations of different seat rings. In FIG. 10, a fire-safe seat ring 60 is mounted in tandem with a cryogenic seat ring 67. FIG. 11 shows a plain metal seat ring 66 in tandem with a cryogenic seat ring 67; FIG. 12 has a metal seat ring 66 in tandem with a molded rubber seat ring 72 which incorporates an integral O-ring; and FIG. 13 shows a plain metal seat ring 66 in tandem with a plastic bifurcated seat ring 70 hving rubber back up ring 71.

From the foregoing description it will be apparent to those skilled in the art that other alternative arrangements and alterations may be made in the illustrated embodiments within the scope of the invention as disclosed and claimed.

Because the valve design is fully symmetrical with respect to the axis of rotation of the disc, the bidirectional valve of the present invention provides lower operating torque than conventional offset single-seat valves, with no torque reversal and with identical torque curves regardless of flow direction.

We claim:

1. A fluid flow control valve comprising a valve body having first and second spaced apart faces and an axial passageway for providing a fluid flow path between the faces; a valve disc mounted in the body, on an axis which perpendicularly intersects the flow axis of the passageway, for rotation between a valve shut position in which the valve disc is perpendicular to the flow axis and a fully open position in which the valve disc is substantially parallel to said flow axis, the valve disc having an annular sealing surface on one side of the axis of disc rotation; an annular seat ring of elastic material mounted in the valve body in a first counterbore positioned so that the seat ring contacts the sealing surface of the valve disc when the disc is in the shut position; and a retainer ring adjacent to the first valve body face to keep the seat ring in said first counterbore, the retainer ring forming with the first counterbore an undercut groove, and the seat ring being bifurcated in cross section to form a rib portion which extends through the groove opening to make interfering elastic contact with the respective sealing surface of the valve disc and two skirt portions which make interfering elastic contact with the sidewalls of the groove, wherein the improvement comprises:

a second counterbore is formed in said first face of the valve body, the valve further comprising a seal ring slidingly fitting in said second counterbore, said first counterbore being formed in said seal ring, said seal ring and said retainer ring forming said undercut groove and a circular groove being provided in one of the mating surfaces of one of the second counterbore and the seal ring;

means positioned in said circular groove for sealing between the valve body and the seal ring, said sealing means comprising a compressible ring made of a material resistant to the operating temperatures, pressures, and fluid of the intended valve service; and means for detachably fastening the retainer ring and the seal ring to the valve body.

2. A control valve according to claim 1 wherein the means for sealing between the valve body and the seal ring comprises a graphite gasket which is compressed between the base of said circular groove and the opposite mating surface of the other of the second counterbore and the seal ring.

3. A control valve according to claim 1 wherein the means for sealing between the valve body and the seal ring comprises a soft O-ring of elastomeric material which is compressed between the base of said circular groove and the opposite mating surface of the other of the second counterbore and the seal ring.

4. A control valve according to claim 1 wherein the means for sealing between the valve body and the seal ring comprises a metal O-ring having a C-shaped cross section which is positioned in said circular groove such that the open side of the C is exposed to higher pressure than the closed side, the O-ring being compressed between the base of the circular groove and the opposite mating surface of the other of the second counterbore and the seal ring.

5. A control valve according to claim 1 wherein the means for sealing between the valve body and the seal ring comprises a resilient ring member having a U-shaped cross section and positioned in said circular groove such that the open side of the U is exposed to higher pressure than the closed side, said resilient ring member being compressed between the base of the circular groove and the opposite mating surface of the other of the second counterbore and the seal ring.

6. A control valve according to claim 1 wherein said seat ring is of plastic material.

7. A control valve according to claim 6 further comprising a metal compression ring positioned between the skirt portions of the plastic seat ring.

8. A control valve according to claim 1 wherein said seat ring is of metal.

9. A control valve according to claim 8 wherein said metal seat ring includes an annular insert ring of plastic material in the inner circumferential surface of said rib portion.

10. A control valve according to claim 6 or 8 further comprising a soft elastomeric O-ring positioned between the skirt portions of the seat ring and the bottom of its groove.

11. A control valve according to claim 1 or 2 or 3 or 4 or 5 wherein the valve is a bidirectional control valve, the disc having a second annular sealing surface spaced apart from the first-mentioned sealing surface on the other side of the axis of disc rotation and a second annular seat ring mounted in the valve body and positioned to contact the second sealing surface of the valve disc when the disc is in the shut position.

12. A bidirectional control valve according to claim 11 wherein the first seat ring is of plastic material and the second seat ring is of metal.

* * * * *